Aug. 15, 1933.    J. S. STOKES    1,922,506
LAMINATED BOX
Filed Oct. 1, 1930    6 Sheets-Sheet 1
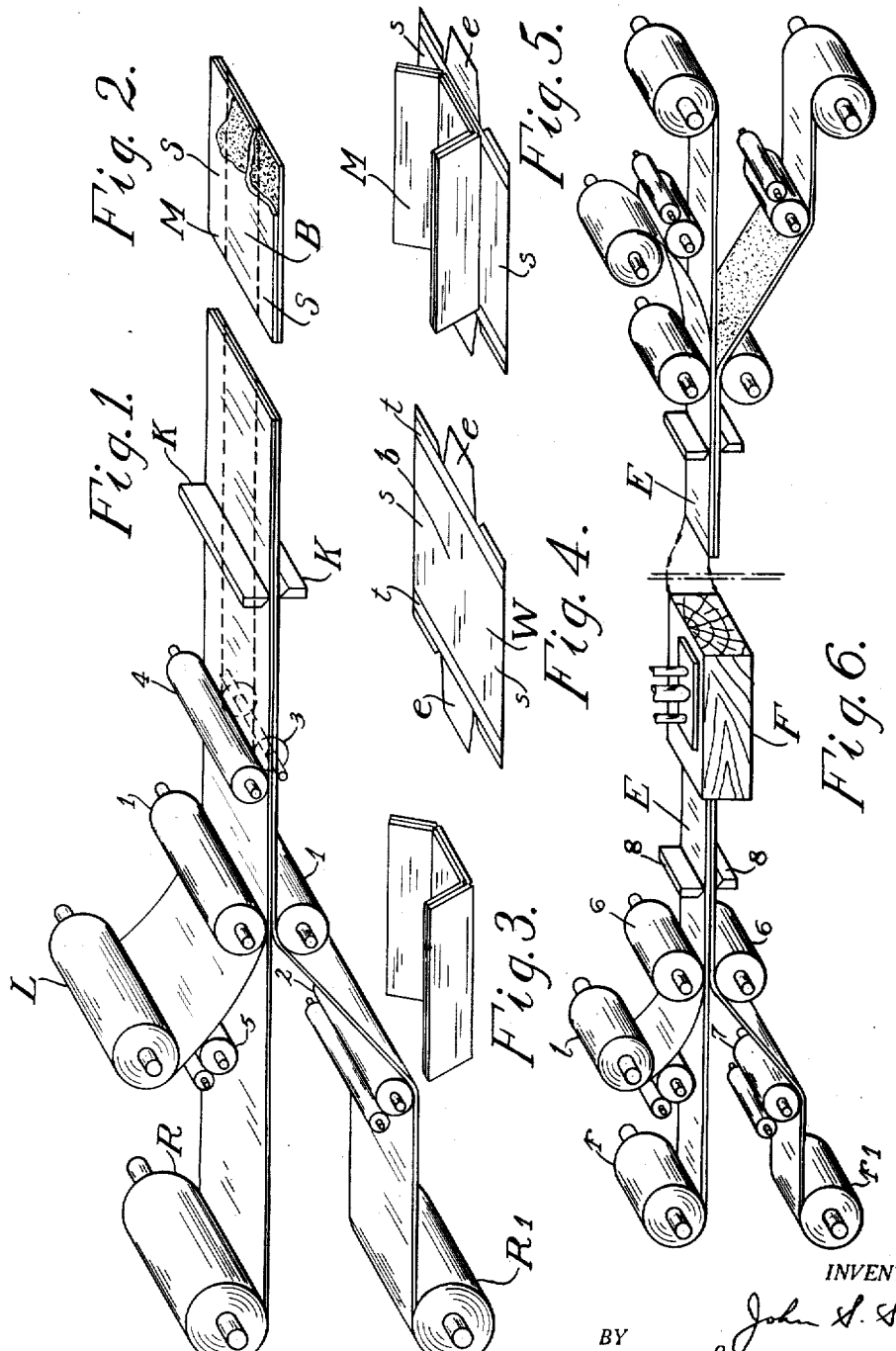
INVENTOR.
John S. Stokes
BY Cornelius L. Ehret
His ATTORNEY.

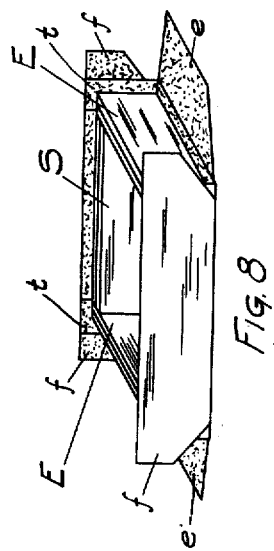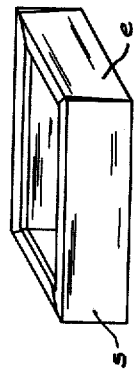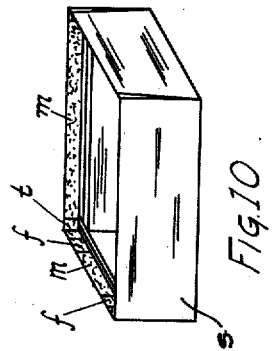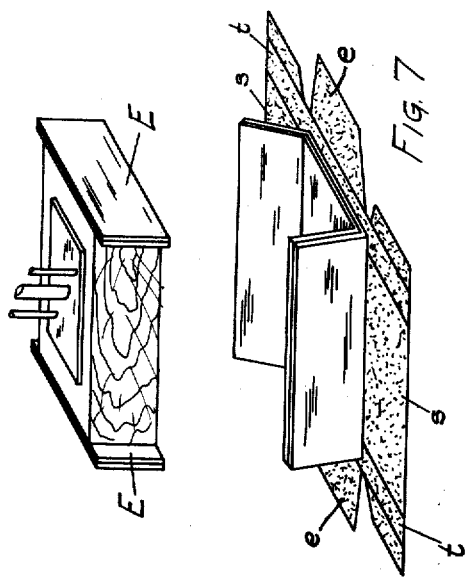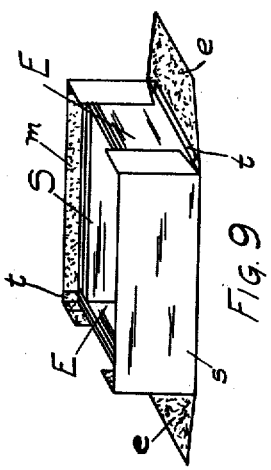

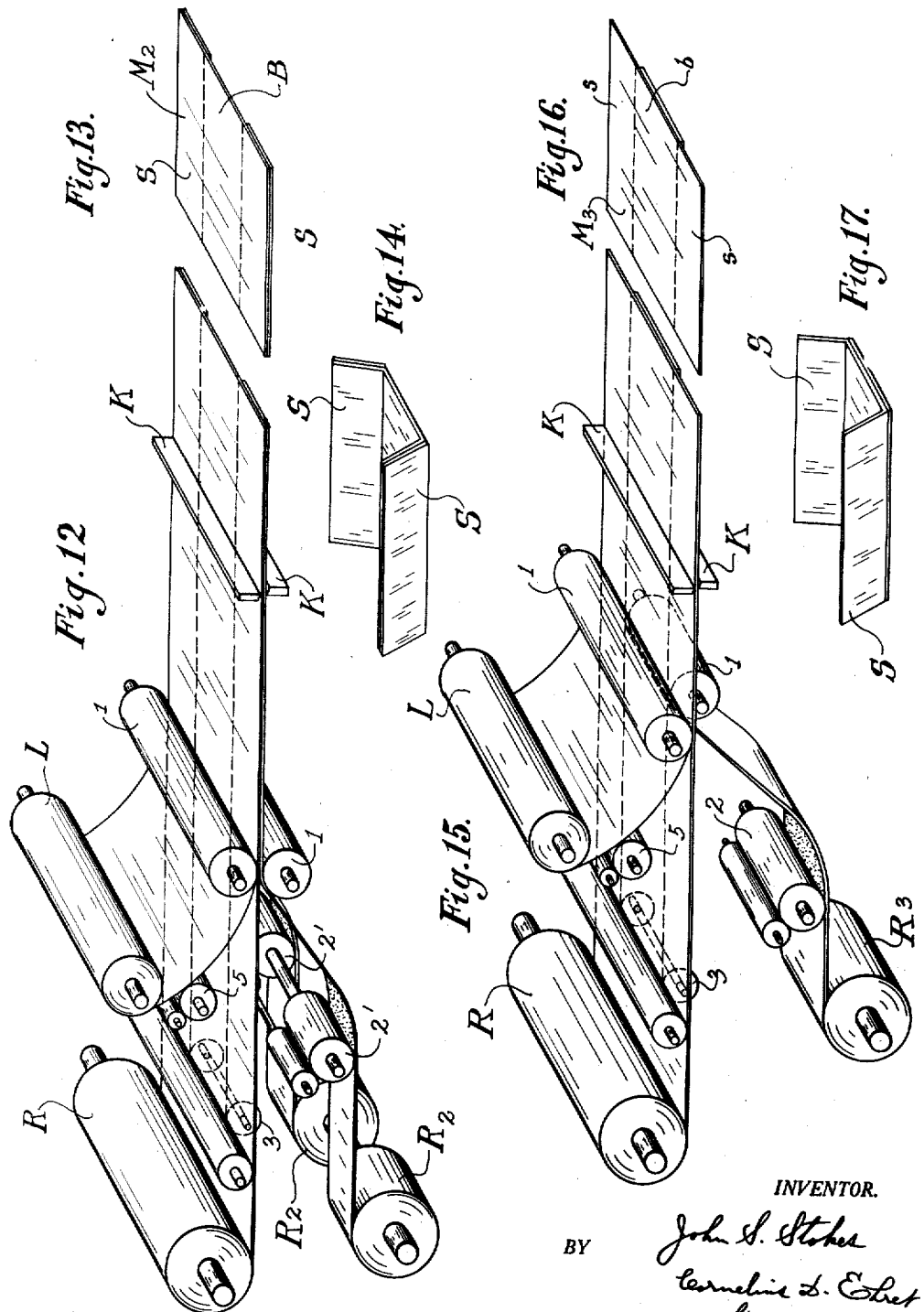

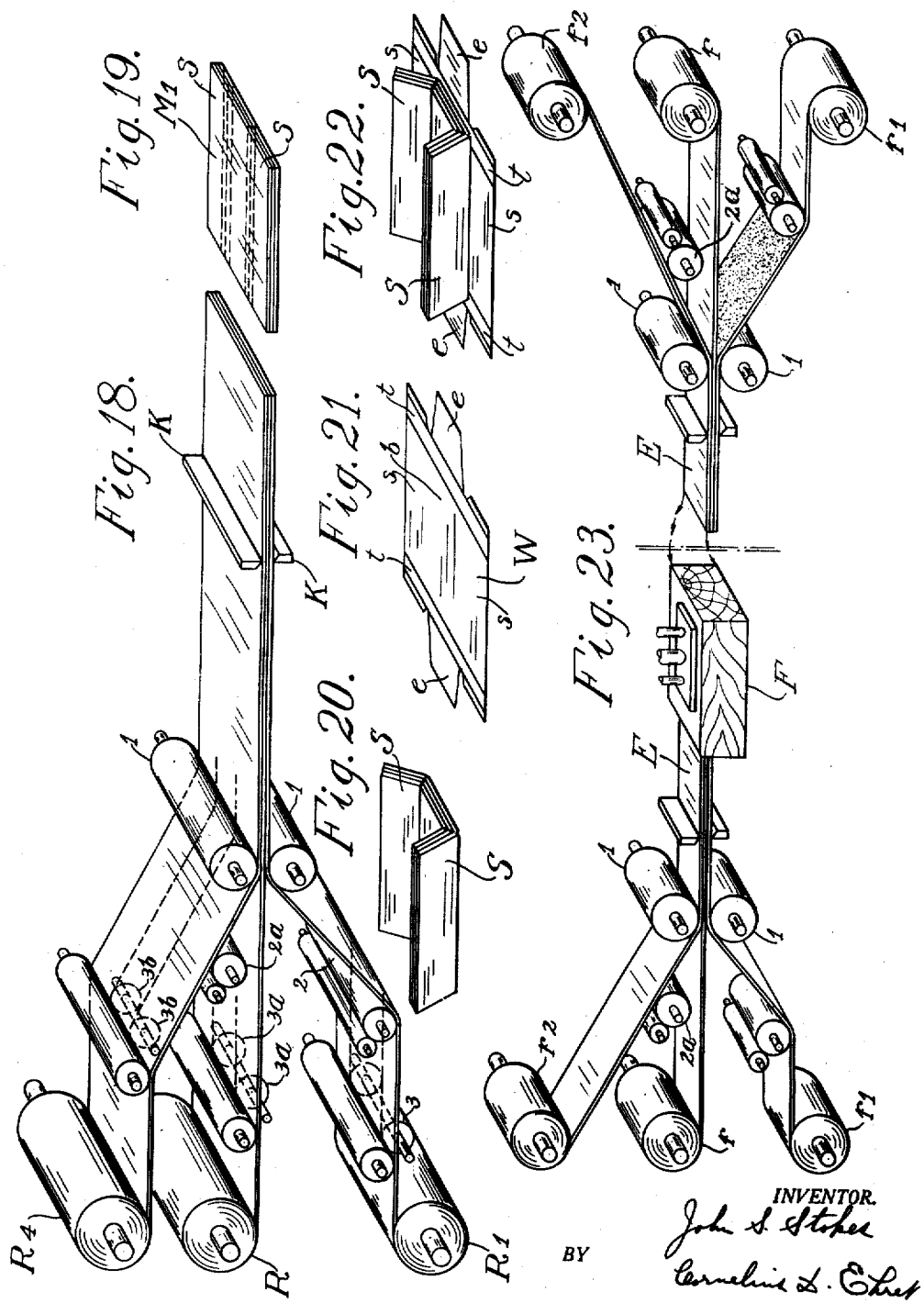

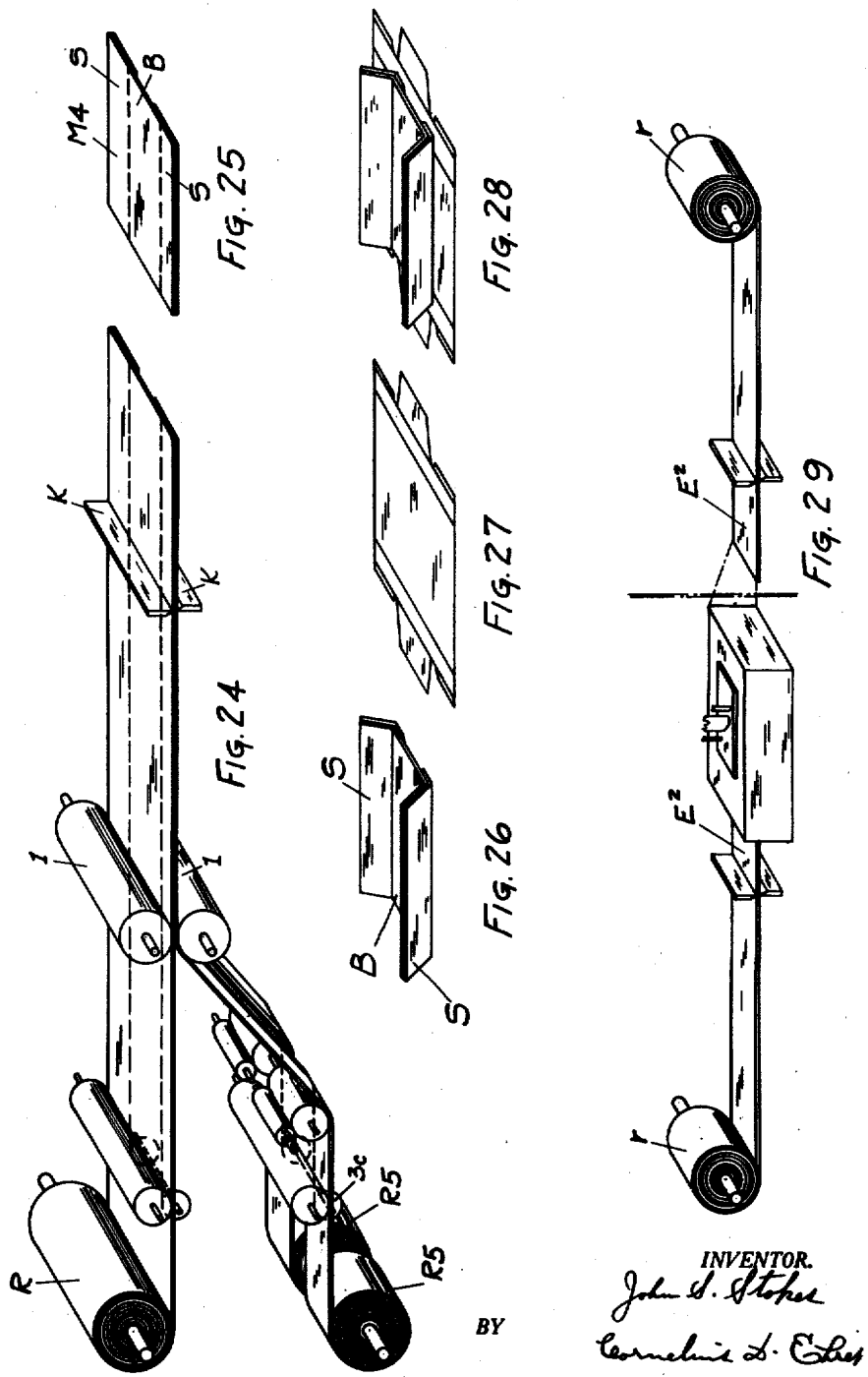

Aug. 15, 1933.  J. S. STOKES  1,922,506
LAMINATED BOX
Filed Oct. 1, 1930    6 Sheets-Sheet 6
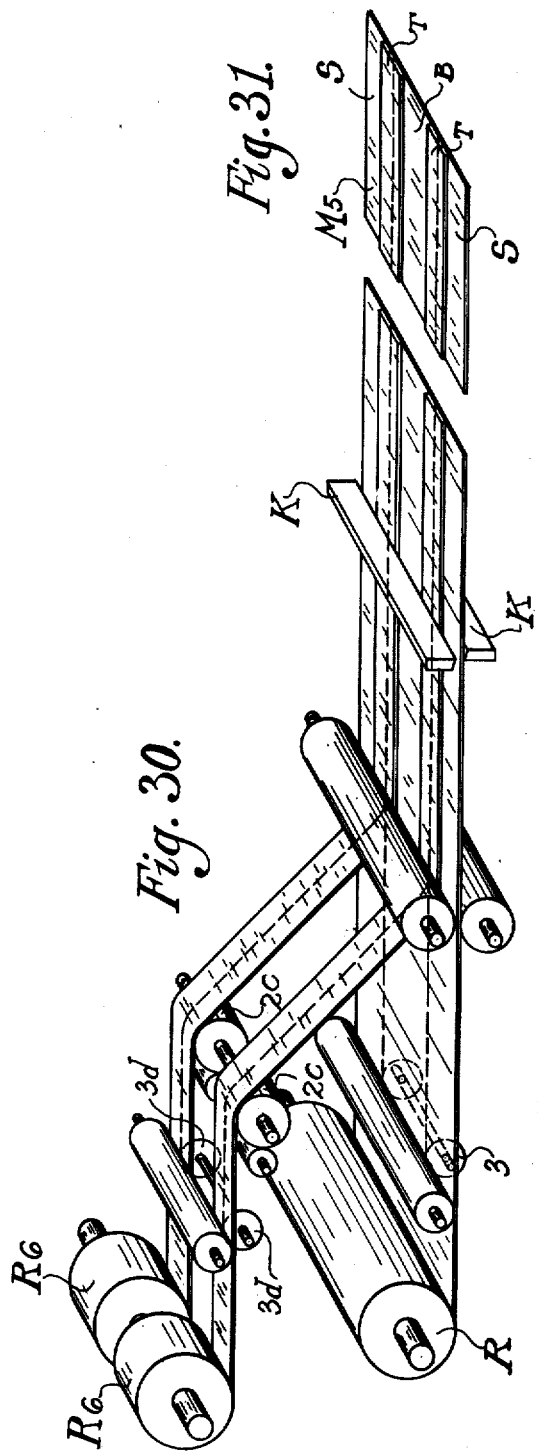
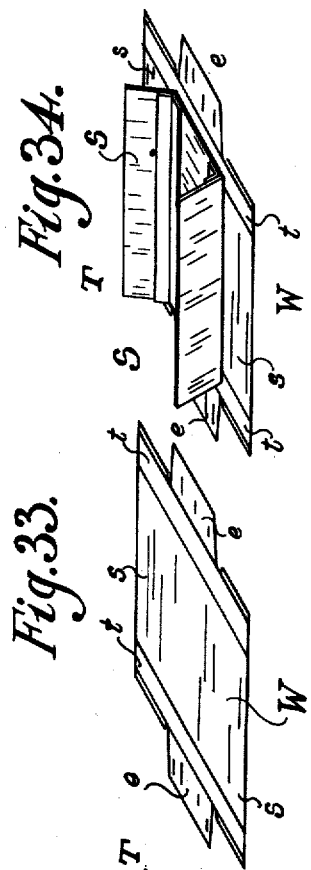
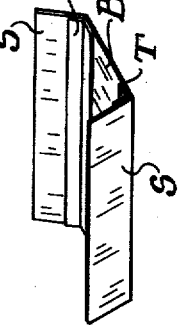
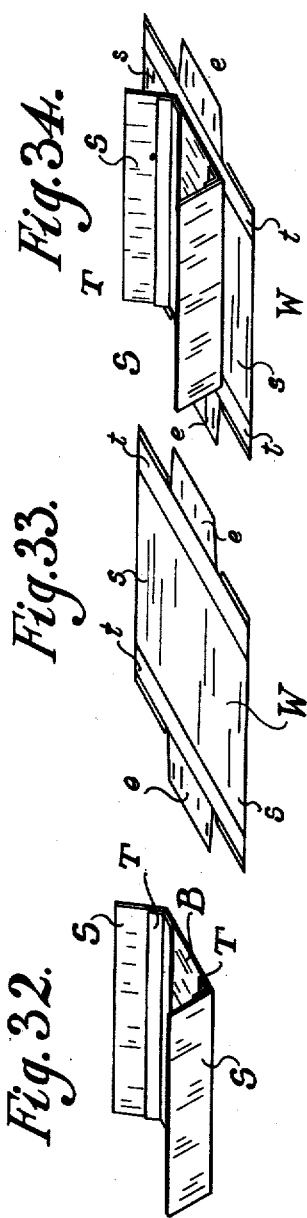
INVENTOR.
John S. Stokes
BY
ATTORNEY.

Patented Aug. 15, 1933

1,922,506

UNITED STATES PATENT OFFICE 1,922,506

LAMINATED BOX

John S. Stokes, Huntingdon Valley, Pa., assignor to Stokes and Smith Company, Philadelphia, Pa., a Corporation of Pennsylvania Application October 1, 1930. Serial No. 485,631

34 Claims. (Cl. 93—43)

My invention relates to the formation of boxes, cartons, containers, or the like, hereinafter generically termed "boxes" from a plurality of separate components attached to each other during a box-forming operation.

In accordance with the methods described and claimed in my co-pending applications Serial Nos. 363,828; 438,229; 464,593; 480,432 filed respectively May 17, 1929; March 22, 1930; June 28, 1930; and September 8, 1930, box components are cut from strips of box material fed from rolls, and without substantial interruption or delay arranged and held in box-forming position by adhesive-coated sheet-material, as wrapped or tab structure. Particularly as heavy or thick box material is not available in rolls, it is a purpose of the present invention to provide methods of making composite boxes from components, one or more of which, are cut from a laminated strip built up to the desired thickness from box material fed from rolls.

Also in accordance with my invention, the feeding of strips from rolls, or otherwise, to form a laminated strip, the cutting of the laminated strip into components, and steps of fabricating a box comprise a continuous process with no substantial delay or interruption between the successive steps.

Further in accordance with my invention, the laminated strip may be lined or covered by sheet-material removed from a roll and applied to one of the strips of box material, as during the formation of the laminated strip.

My invention also resides in the boxes and method of producing them hereinafter described and claimed.

For an understanding of my invention and for illustration of various modes of practicing it, reference is to be had to the accompanying drawings in which, in perspective:

Fig. 1 illustrates the feeding of strips to form a laminated strip.

Fig. 2 represents a box component cut from the strip of Fig. 1.

Fig. 3 shows the component of Fig. 2 bent along its scoring or creasing.

Fig. 4 discloses a wrapper.

Fig. 5 illustrates the component of Figs. 2 or 3 superimposed upon the wrapper of Fig. 4.

Fig. 6 illustrates the feeding of box material from strips to form laminated strips from which other box components are cut.

Fig. 7 illustrates a form block to which the components of Fig. 6 have been transferred in registering relation with the component and wrapper of Fig. 5.

Figs. 8 to 11 inclusive show successive steps of forming a composite box.

Fig. 12, generally similar to Fig. 1, illustrates the formation of a modified type of laminated strip.

Fig. 13 shows a box component cut from the laminated strip of Fig. 12.

Fig. 14 illustrates the component of Fig. 13 bent along its scoring or creasing.

Fig. 15 illustrates the formation of a further type of laminated strip.

Fig. 16 discloses a box component cut from the strip of Fig. 15.

Fig. 17 illustrates the component of Fig. 16 bent along its scoring or creasing.

Fig. 18 discloses the manner of forming a still further type of laminated strip.

Fig. 19 illustrates a box component cut from the strip of Fig. 18.

Fig. 20 shows the component of Fig. 19 bent along its scoring or creasing.

Fig. 21 illustrates a wrapper.

Fig. 22 shows the component of Fig. 20 superimposed upon the wrapper of Fig. 21.

Fig. 23 illustrates the formation of laminated end wall components from strips of box material.

Fig. 24 illustrates the mode of forming another type of laminated strip.

Fig. 25 shows a box component cut from the strip of Fig. 24.

Fig. 26 discloses the component of Fig. 25 bent along its scoring.

Fig. 27 discloses a wrapper.

Fig. 28 shows the component of Fig. 26 disposed upon the wrapper of Fig. 27.

Fig. 29 illustrates the cutting of box ends from strips of box material.

Fig. 30 illustrates the formation of another type of composite or laminated strip.

Fig. 31 shows a box component cut from the strip of Fig. 30.

Fig. 32 illustrates the component of Fig. 31 bent along its scoring.

Fig. 33 discloses a wrapper.

Fig. 34 shows the component of Fig. 32 superimposed upon the wrapper of Fig. 33.

Referring to Fig. 1, as strips of suitable box material, as cardboard, or the like, are removed from the rolls R and R1 and fed toward the rolls 1, 1, their contacting faces are rendered adhesive, as for example, by the adhesive applying or moistening roll 2. The laminated or composite strip thus formed is cut by the knives K, K, or equivalent, to produce a box component M, Fig. 2. Preferably before the laminated strip is cut by the knives K, K either or both of the strips is or are scored or creased, as by the knives 3. In the examples specifically shown, the strips after being joined to form a laminated strip, pass, on their way to the knives K, K, between the scoring or creasing knives 3 and a roller 4. The scoring divides the strip into panels which when the component M is severed from the strip comprise respectively the side panels S, S and the bottom panel B.

In the event that it is desired to produce lined or covered components, sheet-covering material removed from the roll L is rendered adhesive, as by passing over the glue applying or moistening roll 5 and subsequently passed between the rolls 1, 1, which apply it to the laminated strip, or specifically, the upper surface of the strip of box material removed from the roll R.

In accordance with one method of producing a box including the component M, the component, preferably after being bent along its scoring as indicated in Fig. 3, is superimposed upon a wrapper (for example, such as the wrapper W, Fig. 4, described and claimed in co-pending Rider application Serial No. 294,088, filed July 20, 1928) with the bottom panel B of the component in registering relation with the central panel b of the wrapper, to which adhesive has been applied.

The end wall components of the box may be similarly formed. Referring to Fig. 6, strips of box material are removed from the rolls r and r1 and pressed into adhesive engagement by the rolls 6, 6 which may also be feeding rolls. Prior to their engagement, the contacting faces of the strips are rendered adhesive as by the glue applying or moistening rolls 7. The knives 8, 8, cut the laminated strip into lengths corresponding substantially to the width of the box to be formed, and the components, as formed, are preferably immediately transferred to a wrapping station, for example, into engagement with the ends of a form block structure F.

It will be understood that if it is desired to have end walls of greater or lesser thickness than the remainder of the box, the number of strips of box material may be increased or reduced. As an alternative, strips of such thickness may be selected, the strips being of the same or different thickness, as to obtain the desired total thickness of the composite or laminated strip formed thereby.

As shown in Fig. 7 the end wall components E project to some extent beyond the sides of the form block, depending upon the thickness of the side walls of the component M. In the drawings, the extent of projection is exaggerated for the sake of clearness. By relative movement of the form block and the assembly comprising the main component M and the wrapper W, adhering thereto, the end and side walls of the box are brought into their box forming position. The side panels s of the wrapper, are brought into adhesive engagement, preferably simultaneously, with the corresponding side panels of the main component M, Fig. 8, and thereafter, the turn-in flaps f of the wrapper are folded into adhesive engagement with the laminated end components E, Fig. 9, whereupon the end panels e of the wrapper are folded upwardly to overlie the end wall component E and the flaps f, Fig. 10. The marginal portions m of the wrapper panels are folded over the top edges of the box and into engagement with the interior thereof. The components of the box are permanently held in box forming position by the wrapper.

In my co-pending applications above referred to, there are described methods of producing composite boxes from components cut from strips of box material. By the present invention, this method can be extended in its application to form boxes, one or more of whose walls are of greater thickness of cardboard than is obtainable in rolls. Preferably, as shown, the wrapper is provided with tabs t, t, which overlie the edges and corners of the box formed by the separate components.

It will be understood that in lieu of a wrapper, there may be utilized simply a suitable reinforcing material which when applied generally assumes the position of the tabs t. Composite boxes thus formed are disclosed and claimed in my aforesaid co-pending application Serial No. 480,432. It will further be understood that the main component M may be of single thickness cardboard and the end components multi-ply.

Referring to Fig. 12, there is illustrated a method of forming a box component with the side wall sections of greater thickness than the bottom section. Strips of box material removed from the rolls R2, R2 are pressed by the rolls 1, 1 into adhesive engagement with the same surface of box material removed from the roll R, the width of the applied strip corresponding substantially to the height of the box, and when the scoring is effected prior to the formation of the laminated strip, by the knives 3, or equivalent, each of the applied strips extends substantially between the edge of the wider strip removed from the roll R, and the adjacent scoring. Adhesive may be applied to the undersurface of the strip R, or as indicated, and preferably, the rolls 2', 2' may transfer adhesive to, or moisten adhesive upon, the strips from the rolls R2.

The laminated strip thus formed is severed, as periodically, by the knives K, K, to produce main components M2 having side sections S of greater thickness than the bottom section B. It will be understood that one or more additional rolls corresponding in width to the roll R or component M2 may supply material to the laminated strip, so that the bottom section will be greater than single-ply thickness. In all events, however, the strips removed from the rolls R2, R2 will be applied to one surface of the strips, so that the side walls will be of greater thickness. It will also be understood that additional rolls similar to R2, R2, may be utilized to build up a side wall of desired thickness. The main component M2, may be associated with end wall components of single or multi-ply, and held in box-forming position by application of suitable coated sheet-material, as a wrapper or tab structure separate from, or attached to, a wrapper.

The components may be covered or lined, preferably by feeding suitable sheet-material from a roll L into engagement with the laminated strip as it is being formed. For example, the covering material strip is passed over the adhesive applying or moistening roll 5 and then wiped into engagement with the upper surface of the box material removed from the roll R by the rolls 1, 1, to the other side of which is being applied box material from the rolls R2, R2.

In the event that more than one roll corresponding to R is utilized, it will be understood that the covering material from the roll L is applied to the upper surface of one of the strips, for example, the top-most, and the box-material from the rolls R2 is applied to the undersurface of the lowest strip, the terms upper and lower referring to the position the strips assume in the laminated strip. Or otherwise stated, the covering strip L is applied to the surface which would ordinarily form the inside of the box.

Referring to Fig. 15, the strip of box material removed from the roll R3 is narrower than that removed from roll R, and generally corresponds in width to the width of the box bottom. As indicated, the strip R is scored or creased, as by the knives 3, before application of the strip from roll R3, and the width of the applied strip is such that its edges are substantially in register with the scoring. The contacting surfaces of the strips are rendered relatively adhesive, preferably by applying adhesive to or moistening adhesive upon the upper surface of the strip from roll R3, for example, by the roll 2. The laminated or composite strip is cut by the knives K to produce main components M3 having a bottom section B of greater thickness than the side sections S. It will be understood that the thickness of the bottom section may be built up to any desired thickness by suitable choice of thickness of the strip removed from the roll R3, or by utilizing one or more additional rolls of the same width as R3. There may be utilized one or more additional rolls corresponding in width to the roll R, if it is desired also to have side walls of more than single thickness. Lined or covered components may be produced in the manner previously described. Specifically, sheet-covering material removed from the roll L is passed over the adhesive applying or moistening roll 5 and wiped or pressed into engagement by the rolls 1, 1, with the upper surface of the laminated strip being formed.

The component of Fig. 17 may be associated with end wall components of single thickness, or laminated components produced generally as described in connection with Fig. 6.

Referring to Fig. 18, in addition to the rolls R, R1 of Fig. 1, there is a roll R4 of substantially similar width, and the under-surface of the strip material removed therefrom is rendered adhesive as by the rolls 2a and brought into engagement with the upper surface of the strip removed from the roll R by the rolls 1, 1. Each of the strips is scored prior to its engagement. Preferably the distance between the knives 3, 3 for scoring the strip R1, adapted to form the outside of the box, is slightly greater than the distance between the knives 3a, 3a for scoring the intermediate strip from roll R which in turn, is slightly greater than the distance between the knives 3b, 3b which score the inside strip removed from the roll R4.

If it is desired to produce covered or lined components, covering material will be applied to the upper surface of box material removed from the roll R4, substantially as above described. The laminated strip thus formed which is three-ply, though it will be understood that additional thickness may be obtained by increasing the number of rolls, is cut by the knives K, K to form the component M1, Fig. 19, which when bent along its scoring assumes the aspect shown in Fig. 20. It is to be understood that the thickness of the cardboard is exaggerated in the drawings and that the side sections S are bent into vertical position, the top edges of all the layers lying in substantially the same plane. If necessary, the rolls R, R4, etc., may be of progressively decreasing width to ensure this.

The component of Fig. 19 may be secured in box-forming relation with end wall components of similar or different construction as by application of a wrapper W, as previously described.

End wall components E1 of three-ply construction may be formed as graphically shown in Fig. 23 by utilizing the roll r2 of box material in addition to those shown in Fig. 6. The undersurface of the strip removed from this roll is coated or moistened by the roll 2a before it is pressed into engagement with strip removed from the roll r by the rolls 1, 1. The strip as formed is cut into components E1, which without substantial interruption or delay are transferred toward or into engagement with the ends of a form-block F, and there, as previously described, brought into box-forming relation with the main component M1, or equivalent, the components being permanently held in this position by application of a wrapper, or other sheet material.

In Fig. 24, the strip removed from the rolls R5, R5 is wider than the height of the box to be formed, differing in that respect from the modification of Figs. 12, 13, and 14, so that the distance between the adjacent edges of the strips as applied to strip removed from the roll R is less than the width of the box bottom. Preferably, the strips are scored or creased as by the knives 3c before they are applied to the under side of the strip from roll R and the scoring or creasing of each of the strips from roll R5 underlies or substantially registers with the corresponding scoring or creasing of the strip from roll R. The laminated or composite strip as formed is cut by knives K, K to form a box component M4 whose side sections S are of greater thickness than the bottom section B and overlie in part the bottom section adjacent the scoring so that when the box component is bent as shown in Fig. 6, the outside strips extend around and strengthen the lower side edges of the box. The end components E2 with which the main component M4 is brought into box forming position, may be, as indicated, of single thickness and cut from strip fed from the rolls r, r. If desired, however, they may be of additional thickness, as clearly described above in connection with Figs. 6 and 23. Similarly, the main component may be cut from laminated strip of greater number of layers than shown in Fig. 24, all in accordance with the modifications previously discussed.

Referring to Fig. 30, strips removed from the rolls R6, R6 are each applied to the strip removed from the roll R, each of the strips being spaced from the adjacent edge of the strip to which they are being applied, with the adjacent edges of the applied strips being spaced less than the width of the box bottom. Preferably, and as indicated, the strips from the rolls R6 are scored or creased by the knives 3d, 3d and so applied that the scoring overlies or substantially registers with the scoring upon the strip from roll R. The undersurface of the strip from rolls R6 is rendered adhesive as by the rolls 2c, preferably after they are scored.

The composite strip (as formed) is cut by the knives K, K to form the components M5 having thereon the strips T, T each of which overlies in part a side panel S and in part the bottom panel B, so that when the blank is bent, as shown in Fig. 32, the strips of box material T interiorly of the box, materially strengthen the lower side edges. The box may be completed in any of the manners previously described. For example, the component of Fig. 32 may be super-imposed upon a wrapper W, and the box formed in the same manner as described in Figs. 7 to 11.

While all of the steps of the above methods may be manually performed, at least certain of them may be performed by mechanisms of the character shown in co-pending Rider applications Serial Nos. 425,751 and 460,859, filed February 5, 1930 and June 13, 1930, respectively, in which main components in adhesive engagement with a wrapper, or tab structure, are fed into the path of the form-block of a box machine to the ends of which have been transferred box end components cut from continuous strip by the machine, and during operation of the machine, the several components are united by the wrapper, or tabs, to form a box.

It will be understood that the end components will preferably be transferred toward a box fabricating station as they are cut from the laminated strip as it is formed. The main components cut from the strip may be stacked, and in succession delivered to the box wrapping station, for example, by mechanism of the Rider applications above described; or each of the main components as cut from the laminated strip, as formed, is fed without substantial delay individually toward the forming station and there associated with box end components substantially con-currently cut from their respective laminated strips. In either or both the formation of the laminated end components or the laminated main components, the steps of building up the laminated strip, cutting components therefrom, and incorporating the components in a box, comprise a substantially continuous method without substantial interruption or delay between the successive steps.

It is an advantage of my invention, that it is not necessary for a box-maker to keep in stock cardboard corresponding in thickness to the thickness of every box which he may manufacture. By keeping on hand a suitable selection of cardboard of different thickness, he may combine two or more strips to obtain a laminated strip of the desired thickness. The number of possible combinations materially exceeds, of course, the number of different thickness strips or rolls. Further, a laminated box, in all cases, is stronger than one of single-ply cardboard of the same thickness. It will be appreciated that in many instances it is not necessary for the box to be equal thickness throughout, and my present invention discloses methods of obtaining the required strength where desired or necessary, the remainder of the box being of lighter material which effects a saving in the cost and weight of box material.

It is to be understood that my invention is not limited to the modifications specifically illustrated and described but is commensurate in scope with the appended claims.

For brevity, the term "scoring" in the claims is intended to comprehend "creasing" in which the panels are defined by creases formed by blunted rolls which do not cut the fibres of the box material.

What I claim is:

1. The method of making boxes which comprises, feeding a strip of box material from a roll, feeding spaced strips of box body material from rolls into adhesive engagement with one face of said first strip, and severing said composite strip to produce a box component adapted to form the box bottom and opposite vertical walls.

2. The method of making boxes which comprises, feeding a strip of box material from a roll, feeding spaced strips of box body material from rolls in adhesive engagement with one face of said first strip along opposite edges thereof, and severing said composite strip to produce a box component adapted to form a box bottom and opposite vertical walls of substantially greater thickness than said bottom.

3. The method of making boxes which comprises, feeding a strip of box material from a roll, feeding a strip of box material from a roll into adhesive engagement with said first strip and spaced from an edge thereof, and severing the composite strip to produce a box component adapted to form at least one vertical wall of a box and a box bottom of substantially greater thickness than said wall.

4. The method of making boxes which comprises, feeding a strip of box material from a roll, feeding a narrower strip of box material from a roll into adhesive engagement with said first strip and substantially centrally thereof, and severing the composite strip to produce a box component adapted to form opposite walls of a box and a box bottom of substantially greater thickness than said walls.

5. The method of making boxes which comprises, feeding a strip of box body material from a roll, feeding strips of box material from rolls into engagement with one face of the first strip adjacent opposite edges thereof and with the distance between the applied strips less than the width of the box bottom, and severing the composite strip to produce a box component adapted to form a box bottom reinforced at the edges and vertical walls of substantially greater thickness than the box bottom.

6. The method of forming boxes which comprises, feeding a strip of box material from a roll thereof, feeding strips of box body material from rolls into adhesive engagement with one face of the first strip with the distance between adjacent edges of the applied strips less than the width of the box bottom and with remote edges of the applied strips spaced from adjacent edges of the first strip, and severing the composite strip to produce a box component adapted to form only the bottom and opposite walls of a box.

7. The method of forming boxes which comprises, feeding strips of box material from rolls, severing said strips to produce a group of box body components, and prior to the severing of at least one of said strips, adhesively applying thereto box body material removed from a roll to form a laminated strip.

8. The method of forming boxes which comprises feeding strips of box-material from rolls, severing said strips to produce a group of box components, and prior to the severing of certain of said strips, adhesively applying thereto box body material removed from rolls to form laminated strips.

9. The method of forming boxes which comprises, feeding strips of box material from rolls, severing said strips to produce a group of box components, and to obtain desired thickness of one or more walls of said box, the step of adhesively applying additional strip box material from rolls to the strips of box material from which the corresponding components are cut.

10. The method of forming boxes which comprises feeding a strip of box material from a roll, severing the strip to produce a box component adapted to form the box bottom and a pair of vertical walls, feeding another strip of box material from a roll, severing the strip to produce other vertical box walls, and adhesively applying to at least one of said strips before severance thereof, one or more additional strips of box material fed from rolls.

11. The method of forming boxes which comprises, feeding a strip of box material from a roll, severing the strip to produce a box component adapted to form the box bottom and a pair of vertical walls, feeding other strips of box material from rolls, severing the strip to produce another pair of vertical walls, and adhesively applying to at least one of said strips before severance thereof, one or more additional strips of box material fed from rolls.

12. The method of making boxes which comprises, feeding strips of box body material from rolls, effecting adhesive engagement of said strips to form a laminated strip, severing the strip to produce a box component, and prior to said severing operation scoring the box material to define panels of the subsequently cut component.

13. The method of making boxes which comprises, feeding a strip of box material from a roll, scoring the strip, adhesively applying a strip of box body material to the first strip between the scoring and an edge thereof, and severing the scored, laminated strip to produce a box component.

14. The method of making boxes which comprises, feeding a strip of box material from a roll, scoring the strip, adhesively applying a strip of box body material to the first strip between the scoring thereon, and severing the scored, laminated strip to produce a box component.

15. The method of making boxes which comprises, feeding a strip of box material from a roll, scoring and feeding strips of box material from rolls thereof into adhesive engagement with the first strip and with the scoring in registering relation, and severing the scored laminated strip to produce a box component.

16. The method of making boxes which comprises, feeding a strip of box material from a roll, scoring the strip to form parallel panels, scoring and feeding other strips of box material from rolls into adhesive engagement with one face of the first strip with the applied strips overlying spaced panels of the first strip and the scoring thereon in registering relation with scoring of the first panel, and severing the scored laminated strip to produce a box component adapted to form a box bottom and vertical walls of greater thickness.

17. The method of making boxes which comprises feeding a strip of box material from a roll, scoring the strip to form parallel panels, scoring and feeding narrow strips of box material into adhesive engagement with one face of the first strip with each of the applied strips overlying in part a panel not engaged by the other applied strip and in part a panel engaged by the other applied strip, and severing the composite strip to produce a box component adapted to form adjacent box panels with reinforced corners.

18. The method of making boxes which comprises, forming laminated strips of desired thickness by adhesively attaching strips of box body material, and without substantial delay, severing the laminated strips to produce box components, and assembling and holding the box components in position to form a box.

19. The method of making boxes which comprises adhesively securing strips of box body material to form a laminated strip, severing the strip to produce a box component adapted to form the bottom and sides of a box, adhesively securing other strips to form box ends, and assembling the components to form a box all of whose walls are multi-ply thickness.

20. The method of making boxes which comprises adhesively securing strips of box body material to one face of another strip of box body material, along the edges thereof, and severing the composite strip to produce a box component adapted to form a box bottom and side walls of greater thickness than the box bottom.

21. The method of making boxes which comprises adhesively securing a strip of box material to a wider strip of box material intermediate the edges thereof, and severing the composite strip to produce a box component adapted to form side walls of a box and a box bottom of greater thickness.

22. The method of making boxes which comprises adhesively securing strips of box body material to one face of another strip of box body material with the spacing between the strips less than the width of the box bottom, and severing the strip to produce a box component adapted to form the bottom and side walls of a box.

23. The method of making boxes which comprises feeding strips of box body material from rolls, feeding a strip of sheet-covering material from a roll, effecting adhesive engagement of said strips to form a covered, laminated strip, and severing the strip thus formed to produce box components.

24. The method of making boxes which comprises feeding a strip of box body material from a roll, adhesively applying sheet-covering material fed from a roll to one side of said strip, adhesively applying strips of box body-material fed from rolls to the other side of said strip, and severing the covered, composite strip to produce box components.

25. The method of making boxes which comprises, feeding a strip of box-material from a roll, feeding sheet-covering material from a roll into adhesive engagement with one side of said strip, feeding strips of box material in adhesive engagement with the other side of said strip along the edges thereof, and severing the composite covered strip to produce a lined box component adapted to form a box bottom and side walls of greater thickness.

26. The method of making boxes which comprises, feeding strips of box body-material from rolls, into adhesive engagement, feeding sheet-material from a roll into engagement with the outside surface of one of said strips, and severing the covered laminated strip to produce covered box components.

27. The method of making boxes which comprises, feeding a strip of box material from a roll, feeding sheet-covering material from a roll into adhesive engagement with one side of said strip, feeding a narrow strip of box-material into adhesive engagement with the other side of said strip intermediate the edges thereof, and severing the covered, composite strip to produce box components.

28. The method of forming boxes which comprises, feeding strips of box material from rolls, severing said strips to produce a group of box components, before severance of at least one of said strips, adhesively applying thereto strip box material to obtain a desired thickness of at least one of the box walls, and holding said group of components in box-forming position by adhesively applied sheet material overlying corners of the box.

29. The method of forming boxes which comprises feeding strips of box material from rolls, feeding strips of box-lining material into adhesive engagement with one face of said strips, severing said strips to produce a group of lined box components, before severance of at least one of said strips, adhesively applying to the unlined face thereof, strip box material to obtain desired thickness of at least one of the box walls, and applying a wrapper to hold said components in box-forming position.

30. A box comprising a component forming the box bottom and a pair of vertical walls, separate components forming the other pair of vertical walls, at least one of said three components comprising adhesively attached strips of box material of simple rectangular outline, and sheet material applied to said components and comprising the sole means holding them permanently in box-forming position.

31. A box comprising a component forming the box bottom and a pair of vertical walls, separate components forming the other pair of vertical walls, said first component comprising strips of box material affording difference in thickness between the bottom and side walls, and sheet material adhesively engaging the different strips of said first component and comprising the sole means permanently holding said components in box-forming position.

32. A box comprising a component forming the box bottom and a pair of vertical walls having the surface thereof forming the box interior covered with lining paper, separate components forming the other pair of vertical walls, each having the surface thereof forming the box interior covered with lining paper, at least one of said three components having a strip of box material adhesively attached to the unlined face thereof, and a wrapper covering the exterior of the box which is formed, at least in part, by said attached strip.

33. The method of making boxes which comprises feeding strips of box body material from rolls, effecting adhesive engagement of said strips of box body material to form a laminated strip, scoring the strip, and severing the strip to form scored laminated box elements adapted to form the box bottom and at least one vertical wall.

34. The method of making boxes which comprises feeding strips of box body material into adhesive engagement to form a laminated strip whose width corresponds to twice the vertical height of the boxes to be formed plus a dimension of the box bottom, scoring the strip to define box panels, and severing the strip to form scored laminated box components.

JOHN S. STOKES.

CERTIFICATE OF CORRECTION.

Patent No. 1,922,506.

August 15, 1933.

JOHN S. STOKES.

It is hereby certified that error appears in the printed specification of the above numbered patent requiring correction as follows: Page 1, line 14, for "wrapped" read wrapper; page 4, lines 104 and 128, claims 5 and 7, respectively, strike out the word "body" and insert the same before "material" in lines 105 and 126, of said claims; and that the said Letters Patent should be read with these corrections therein that the same may conform to the record of the case in the Patent Office.

Signed and sealed this 28th day of November, A. D. 1933.

F. M. Hopkins (Seal)

Acting Commissioner of Patents.

components in box-forming position by adhesively applied sheet material overlying corners of the box.

29. The method of forming boxes which comprises feeding strips of box material from rolls, feeding strips of box-lining material into adhesive engagement with one face of said strips, severing said strips to produce a group of lined box components, before severance of at least one of said strips, adhesively applying to the unlined face thereof, strip box material to obtain desired thickness of at least one of the box walls, and applying a wrapper to hold said components in box-forming position.

30. A box comprising a component forming the box bottom and a pair of vertical walls, separate components forming the other pair of vertical walls, at least one of said three components comprising adhesively attached strips of box material of simple rectangular outline, and sheet material applied to said components and comprising the sole means holding them permanently in box-forming position.

31. A box comprising a component forming the box bottom and a pair of vertical walls, separate components forming the other pair of vertical walls, said first component comprising strips of box material affording difference in thickness between the bottom and side walls, and sheet material adhesively engaging the different strips of said first component and comprising the sole means permanently holding said components in box-forming position.

32. A box comprising a component forming the box bottom and a pair of vertical walls having the surface thereof forming the box interior covered with lining paper, separate components forming the other pair of vertical walls, each having the surface thereof forming the box interior covered with lining paper, at least one of said three components having a strip of box material adhesively attached to the unlined face thereof, and a wrapper covering the exterior of the box which is formed, at least in part, by said attached strip.

33. The method of making boxes which comprises feeding strips of box body material from rolls, effecting adhesive engagement of said strips of box body material to form a laminated strip, scoring the strip, and severing the strip to form scored laminated box elements adapted to form the box bottom and at least one vertical wall.

34. The method of making boxes which comprises feeding strips of box body material into adhesive engagement to form a laminated strip whose width corresponds to twice the vertical height of the boxes to be formed plus a dimension of the box bottom, scoring the strip to define box panels, and severing the strip to form scored laminated box components.

JOHN S. STOKES.

CERTIFICATE OF CORRECTION.

Patent No. 1,922,506.

August 15, 1933.

JOHN S. STOKES.

It is hereby certified that error appears in the printed specification of the above numbered patent requiring correction as follows: Page 1, line 14, for "wrapped" read wrapper; page 4, lines 104 and 128, claims 5 and 7, respectively, strike out the word "body" and insert the same before "material" in lines 105 and 126, of said claims; and that the said Letters Patent should be read with these corrections therein that the same may conform to the record of the case in the Patent Office.

Signed and sealed this 28th day of November, A. D. 1933.

F. M. Hopkins (Seal)

Acting Commissioner of Patents.

CERTIFICATE OF CORRECTION.

Patent No. 1,922,506.  August 15, 1933.

JOHN S. STOKES.

It is hereby certified that error appears in the printed specification of the above numbered patent requiring correction as follows: Page 1, line 14, for "wrapped" read wrapper; page 4, lines 104 and 128, claims 5 and 7, respectively, strike out the word "body" and insert the same before "material" in lines 105 and 126, of said claims; and that the said Letters Patent should be read with these corrections therein that the same may conform to the record of the case in the Patent Office.

Signed and sealed this 28th day of November, A. D. 1933.

F. M. Hopkins (Seal)  Acting Commissioner of Patents.